United States Patent Office 3,361,843
Patented Jan. 2, 1968

3,361,843
METHOD OF DYEING A BLEND OF A POLYOLEFIN AND A NITROGEN CONTAINING POLYMER BY USING A DYEBATH CONTAINING LEWIS ACIDS
Robert Miller, Columbia, S.C., and Frederick C. Loveless, Oakland, and Milton Farber, Verona, N.J., assignors to Uniroyal, Inc., a corporation of New Jersey
No Drawing. Filed June 15, 1964, Ser. No. 375,328
29 Claims. (Cl. 260—857)

This application is a continuation-in-part of our copending applications Ser. No. 177,720, filed Mar. 6, 1962, and Ser. No. 290,291, filed June 25, 1963, both now abandoned.

This invention is directed to the production of dye-receptive, shaped hydrocarbon polymers. It is accomplished by means of two successive changes in these polymers: first, incorporation of a minor amount of an inherently dye-receptive, highly polar, basic polymer in the hydrocarbon polymer; second, treating this mixture with an acidic chemical capable of diffusing into the mass and reacting with the basic polymer. The treated material is thereby made dyeable by conventional techniques. The invention provides a cheap, practical method of rendering these difficulty dyeable hydrocarbon polymers highly dye-receptive. The dyed articles are color-fast, and intensely and uniformly dyed.

Hydrocarbon polymers, particularly the paraffinic ones, are difficult to dye, as they lack functional groups, known as dye receptors, to which dye molecules may become attached. It is known in the prior art to add dye receptor materials, particularly various nitrogen base polymers, to a fiber, either before or after it is extruded, to make it dyeable. However, in such cases, when minor amounts of nitrogen base polymer, i.e., less than 10%, are incorporated in a hydrocarbon polymer fiber, it is undyeable with acid dyes, metallized dyes, and direct dyes, except for the production of pale tints. Similarly, treatment of a hydrocarbon polymer fiber, containing no nitrogen-base polymer additive, with acidic materials produces no increase in dyeability with the above dye classes. We have discovered that, when these two techniques are combined, the fiber is made highly dyeable. The present invention has thus produced a result which is totally unexpected and which is completely unique: mixtures containing very small amounts of dye receptor, amounts which ordinarily confer little or no dyeability, are made very highly dyeable. We find that the preceding is true also when the nitrogen base monomer has been incorporated as a graft copolymer with the hydrocarbon polymer rather than as a separate polymer additive.

Dyeability in difficult-to-dye fibers may be achieved by means of an additive alone, but in these cases it has been necessary to use large quantities of additive, i.e., over 10%. With such large amounts of additive present, the resulting fiber suffers great disadvantages: physical properties are degraded; the material, because of incompatibility of the mixed polymers, is difficult or impossible to extrude and process; the fiber is rough and brittle; and the added expense is great. It would thus be highly desirable to be able to achieve dyeability in such fibers with the addition of less than 10% of added basic polymer. Our invention represents a practical method for achieving this end.

The reason for the difficulty in dyeing blends of hydrocarbon polymer with less than 10% of a polar, dye-receptive polymer stems from the fact that the plastic, blended mixtures behave as though the polar polymer had become encapsulated or shielded in some manner, so that water-soluble, ionized dyes, comprising the large classes of acid dyes, which includes milling or strong acid dyes, direct dyes, metallized dyes, reactive dyes, etc., cannot penetrate to them. Treatment of these blends with acidic materials according to our invention makes them permeable to the above dyes.

We have discovered that drawn or undrawn fibers and filaments, and yarns and fabrics made therefrom, composed of hydrocarbon polymer material containing from 0.5 to 10% of a polymerized nitrogen base can be made highly receptive to the dyes mentioned above by treating the filamentous material containing such polymer for a short time with certain acidic chemical reagents which are capable of dissolving in or diffusing into the hydrocarbon polymer, where they react with the nitrogen-base polymer therein. The material so treated may then be dyed in any conventional manner with the above-named dyes.

The term "hydrocarbon polymer" is used herein to refer to the matrix material of which the fiber is largely composed. The preferred material in our invention is polypropylene, and further discussion will be mainly in terms of this representative hydrocarbon polymer. However, the invention is equally applicable to all fiber-forming hydrocarbon linear high polymers, including poly-(1-alkenes) such as polyethylene, poly-1-butene, poly (4-methyl-1-pentene), copolymers of two or more 1-alkenes, copolymers of non-terminal olefins with 1-alkenes, etc. Physically, the polypropylene may take the form of filaments, yarns, fabrics, films, and sheets, or other shaped form presenting a high ratio of surface to volume.

Examples of the dye receptor polymers which we incorporate in the hydrocarbon polymers are basic nitrogen-containing materials of the following types:

(1) Thermoplastic polymers of vinyl-substituted mono- and polycyclic pyridine bases, either homopolymers or copolymers, including graft copolymers.

(2) Thermoplastic polyamides, including condensation homopolymers and copolymers, in which the amide groups are an integral part of the polymer chain, and addition homopolymers and copolymers having pendant groups containing or consisting of amide groups.

(3) Amine polymers, including condensation homopolymers and copolymers, in which the amine group is an integral part of the polymer chain, and addition homopolymers and copolymers having pendant groups which include or consist of amine groups.

Other basic nitrogen polymers which may be used in our invention are polyurethanes, polyureas, poly(vinylcarbazoles), aniline-formaldehyde resins, etc., all of which possess a basic ionization constant greater than $10^{-14}$.

The basic nitrogen polymers employed are not readily extractable from admixtures thereof with the hydrocarbon polymer, under the conditions of treating and dyeing used. Thus, after a one-hour extraction of the fiber with boiling water at a pH of 3, at least 10% of the originally added nitrogen polymer should remain in the hydrocarbon polymer. The amount of the basic nitrogen polymer added to the hydrocarbon polymer should be sufficient so that, after the acid treatment of the invention, it will bind the amount of dye required to produce the shade desired.

The vinyl-substituted monocyclic and polycyclic pyridine base dye-receptor polymer incorporated in the hydrocarbon polymer in accordance with the invention is present either as a homopolymer, or as a copolymer with another vinyl monomer copolymerizable therewith, or as a graft copolymer with a hydrocarbon high polymer. The vinyl-substituted mono- and polycyclic pyridine base dye-receptor polymers used are those based, for example, on monovinylpyridines and monovinylquinolines.

The monovinylpyridines useful in making the above named dye-receptive polymers employed in the invention include 2-vinylpyridine, 3-vinylpyridine, 4-vinylpyridine, 5-methyl-2-vinylpyridine, 2-ethyl-5-vinylpyridine, 2-methyl-5-vinylpyridine, 2-ethyl-6-vinylpyridine, 2-isopropenylpyridine, etc. Polymerizable olefinic monomers with which the monovinylpyridine may be copolymerized include a different monovinylpyridine, acrylic and methacrylic esters typified by ethyl acrylate and methyl methacrylate, vinyl aryl hydrocarbons typified by styrene and vinyltoluenes, and butadiene-1,3. Alternatively, the monovinylpyridine may be graft-copolymerized, by well-known methods, with a previously formed linear high polymer, typified by polyethylene, polypropylene, polystyrene, and polybutadiene. It is always desirable that the basic polymer contain no more than a minor proportion of material copolymerized with a monovinylpyridine, since only the pyridine portion of the polymer additive is active in enhancing the dyeability of the hydrocarbon polymer.

The polyamides useful as the dye-receptors employed in this invention include homopolyamides such as poly(hexamethylene adipamide), poly(hexamethylene sebacamide), polypyrrolidinone, polycaprolactam, polyenantholactam, and copolyamides such as Zytel 61 (Du Pont), an interpolymer of hexamethylene adipamide and hexamethylene sebacamide with caprolactam.

As examples of vinyl polymers with pendant groups consisting of or containing amide groups there are the substituted poly(vinylpyrrolidinones), e.g., N - vinyl - 3 - alkylpyrrolidonone, and N-substituted polyacrylamides, e.g., N-butylacrylamide. Also usable are copolymers of the amide-containing vinyl monomers with other olefinic monomers such as acrylic and methacrylic esters typified by ethyl acrylate and methyl methacrylate, vinyl aryl hydrocarbons typified by styrene and vinyltoluenes, and butadiene-1,3. Alternatively, the vinylpyrrolidinones or acrylamides may be graft-copolymerized, by well-known methods, with a previously formed linear high polymer, typified by polyethylene, polypropylene, polystyrene, and polybutadiene. It is always desirable that the basic polymer contain no more than a minor proportion of material copolymerized with the vinylpyrrolidinones or acrylamides, since only the amide portion of the polymer additive is active in enhancing the dyeability of the hydrocarbon polymer.

As examples of amine polymers useful as the dye-receptor employed in this invention there are the condensation products of epihalohydrins or dihaloparaffins with one or more amines, such as those disclosed in Belgian Patent No. 606,306, exemplified by the condensation product of dodecylamine, piperazine and epichlorohydrin; as examples of addition polymers with pendant groups consisting of or containing amines there are the reaction product of a styrene-maleic anhydride copolymer with 3-(dimethylamino)-propylamine (the reaction product being a polyamino-polyimide), and styrene-allylamine copolymers such as those disclosed in U.S. Patent No. 2,456,428.

Examples of the introfusible acidic chemical reagents used in the invention are the following Lewis acids and Lewis acid generating materials:

(1) Mineral acids, such as hydrochloric acid, hydrobromic acid, sulfurous acid, nitric acid, sulfuric acid, phosphoric acid and perchloric acid. The last three acids, highly ionic materials, are effectively employed at high application temperatures (>60° C.) as shown herebelow.

(2) The anhydrous acid gases corresponding to the mineral acids defined above, whether the undissociated acid or the acid anhydride, illustrated by hydrogen chloride, hydrogen bromide, sulfur dioxide, and nitrogen dioxide. A source of hydrogen ions such as water in or on the hydrocarbon polymer is essential in those cases where the reagent is not a proton-donating compound.

(3) Organo-carboxylic acids, including aliphatic and aromatic acids, mono-carboxylic and dicarboxylic acids, saturated and unsaturated acids. Suitable acids are exemplified by formic, acetic, propionic, stearic, and other alkanoic acids in the $C_{1-18}$ range, undecylenic, oleic, benzoic, salicyclic, succinic, adipic, phthalic, bromoacetic, chloroacetic and lactic acids. The organic acid may be used in its liquid or molten state (when its melting point is below the temperature selected for the fiber treatment), or in solution in a volatile organic solvent such as benzene or toluene. It may be used in water solution provided that the acid is used at a concentration at which the dye uptake by articles treated in accordance with the invention is significantly increased.

(4) Those halide compounds which liberate hydrohalic acid on contact with water at the temperature of the treatment. Examples of such compounds are:

(a) Halides of non-metallic elements such as phosphorus and sulfur (exemplified by $PCl_3$, $POCl_3$, $S_2Cl_2$, $SOCl_2$, $So_2Cl_2$);

(b) Metal halides such as the halides of zinc, tin, and aluminum;

(c) Acid halides of organic acids of the class defined in section 3, and organosulfonyl halides, typified by acetyl, benzoyl, adipoyl, and p-toluenesulfonyl chlorides;

(d) Activated alkyl halides containing a conjugated grouping which enhances the reactivity of the halogen atom; e.g., allylic and benzylic halides (such as chlorides).

(5) Other acidic and potentially acidic compounds capable of forming complexes or addition compounds with basic nitrogen polymers, e.g., boron trifluoride, n-butyl borate, and phenol.

In all these treatments, hydrogen ions are present either as part of the acid itself, as in nitric or acetic acid, or they may be furnished by water, in or on the fiber, in the amount of at least 1% (OWF).

Representative of those reagents which have the greatest effect in the process of our invention, from the standpoint of increasing the dyeability of hydrocarbon polymers containing up to 10% of polymerized vinylpyridine base dye receptor, are acetic acid, stearic acid, oleic acid, hydrochloric acid, thionyl chloride, sulfurous acid, and p-toluenesulfonyl chloride.

Representative of those reagents which have the greatest effect in the process of our invention, from the standpoint of increasing the dyeability of hydrocarbon polymers containing up to 10% of an amine polymer dye receptor, are acetic acid, hydrochloric acid, adipoyl chloride, and thionyl chloride.

Representative of those reagents which have the greatest effect in the process of our invention, from the standpoint of increasing the dyeability of hydrocarbon polymers containing up to 10% of a polyamide dye receptor, are formic acid, hydrochloric acid, and phosphorus oxychloride.

The temperature range within which our chemical treatment of the shaped polymer-blend material is carried out is not critical but is of course below the softening temperature of the particular hydrocarbon polymer employed. For polypropylene this would be below 160° C., its melting point. In practice, however, with drawn fibers of polypropylene, for instance, which shrink greatly at temperatures above 140° C., temperatures not greater than 140° C. will of course be used to avoid such shrinkage. There is likewise no critical lower limit, but the lowest useful temperature will simply be dictated by rates of diffusion and reaction, and in many cases 0° C. represents a practical lower value.

The duration of the acid treatment may vary from less than 1 second up to 3 hours, depending on the reagent and the temperature selected. Usually a time of from 5 seconds to 30 minutes, using temperatures in the range from about 20° to about 140° C., is satisfactory and sufficient for most reagents and solutions.

The physical form of the polymer-blend shaped objects on which these treatments is carried out may vary widely.

As fiber, this can be monofilament or multifilament; plain, bulked, or texturized; staple; tow, or stock. It may be films, sheets, or fabrics. The treatment may be done batchwise or in any convenient continuous fashion. A number of efficient and practical techniques will readily suggest themselves to those skilled in the art.

Although our invention is applicable in the range of 0.5 to 10% content of nitrogen base polymer in the fiber, we prefer to employ the range of 0.5–5%, the particular value depending upon the nitrogen content and relative basicity of the additive. This lower range is advantageous because of the high cost of the nitrogen base polymers and because it minimizes any undesirable effects on the physical properties of the fiber. The presence of 0.5 to 5% of nitrogen base polymer is usually sufficient to exhaust a 1% (OWF) dye bath, which gives deep colors with many dyes.

The vinylpyridine polymers used in the examples herein include suspension polymers and solution polymers, the polymerization initiator used having been azobisisobutyronitrile. The polymers had an intrinsic viscosity in the range from 0.2 to 2.0 measured in pyridine at 30° C. The polyamines used in the examples were made by conventional means, e.g., by procedures similar to those described in Belgian Patent No. 606,306 or by treatment of a styrene-maleic anhydride copolymer with 3-(dimethylamino)propylamine, as described, for instance, by Cohen and Minsk (J. Org. Chem. 24, 1404 (1959)). The polyamide high polymers used were obtained from commercial sources. The hydrocarbon polymers used were polyethylene, polypropylene, and poly(4-methylpentene-1). The mixtures of hydrocarbon polymer and the dye acceptor polymers were made by blending, tumbling or any convenient method, and they were then spun into yarns by conventional melt-spinning.

The acid treatment step may be effected either before or after the yarn has been drawn—most conveniently after the drawing. Hanks, coils, and knit fabrics of the resulting filaments were variously subjected to treatments with acidic reagents according to the invention, and were thereafter dyed, as described in the detailed examples which follow. The abbreviation "OWF" used herein means "on the weight of the fiber," in the parlance of the dyers' trade.

*Example 1*

Drawn multi-filament (524 denier, 35 filaments) of polypropylene containing approximately 2.9% of admixed poly(2-vinylpyridine) was immersed in glacial acetic acid at 60° C. for 1.5 minutes. The fiber was removed, washed in water, and different portions of the batch were dyed with typical acid dyes, viz., Orange II (C.I. 15510) and Alizarin Sky Blue B (C.I. 62105); with a typical acid metallized dye, viz., Amalan Blue GGL (C.I. 14880); and with a neutral metallized dye, Capracyl Violet BD (Du Pont). In all cases dark shades were produced. The samples were found to be fast to laundering and dry cleaning.

*Example 2*

That the reaction in the fiber between the poly(2-vinylpyridine) and the acid reagent forms in the fiber a stable reaction product which is not removed by drastic exposure of the treated fiber to hot air or to steam is demonstrated as follows:

Tubular knit fabric prepared from multi-filament (524 denier, 35 filament) of polypropylene containing 2.9% of poly(2-vinylpyridine) was immersed in glacial acetic acid at 60° C. for 1.5 minutes. In one case the fabric was then heated in air at 160° F. for 10 days; in another case it was exposed to live steam at 15 lbs. pressure for 15 minutes. Both samples were then found to dye readily with Orange II, the dyeability of the fiber by our process not being lessened by either hot air or steam.

*Example 3*

Undrawn multi-filaments of polypropylene containing in different batches 1, 3, 5, and 7 parts of poly(2-vinylpyridine) per 100 parts of polypropylene were immersed in undiluted phosphorus trichloride at 45° C. for one-half minute, rinsed with acetone and then with water, and were then dyed in an aqueous dye bath containing 2% (OWF) of Orange II dye, 5% of sulfuric acid (OWF), and a small amount of nonylphenol/ethylene oxide condensate (a commercial wetting agent known as Triton X–100). The ratio of fiber to liquid was 1:30, and the immersion time one hour, at 70°–100° C. The samples were then washed in a 0.5% (OWF) aqueous solution of Triton X–100 for 10 minutes at 70° C. All the samples were found to have been dyed to deep orange shades.

When the same procedure was followed except that the treatment with $PCl_3$ was omitted, the fibers containing 1 and 3 parts of poly(2-vinylpyridine) were found to be completely colorless, and those containing 5 and 7 parts to be only very slightly tinted.

*Example 4*

Skeins of drawn yarn (3500 denier, 210 filament) of polypropylene containing 2.9% of poly(2-vinylpyridine) were soaked in glacial acetic acid at 60° C. for 4 minutes. They were then rinsed in water, scoured, and dyed (1% dye OWF, 1:30 ratio of fiber weight to dye bath) with the following dyes:

Alizarin Sky Blue B (C.I. 62105, Acid Blue 78);
Capracyl Orange R (Acid Orange 60).

After dyeing, the skeins were scoured with 0.3% Triton X–100 at 70° C. until no more color bled out.

Similar dyed samples were prepared, but without the acetic acid treatment. The amount of dye on the fiber was then determined for each sample, using extraction with ammonia water followed by colorimetric analysis for the first dye, and determination of metal content for the second. Ratios of dye up-take of the acetic acid-treated samples to that of the untreated ones were:

Alizarin Sky Blue B—36:1
Capracyl Orange R—9.6:1.

*Example 5*

A sheet of polypropylene containing 2.9% of poly(2-vinylpyridine), and approximately 0.005 inch thick, was soaked for five minutes in boiling acetic acid; another sheet was soaked in $POCl_3$ for four minutes at 90° C., then rinsed in acetone. After scouring for 20 minutes at 93° C., both samples dyed to a deep blue color with Alizarin Sky Blue B. An untreated sheet, when similarly dyed, was virtually colorless.

*Example 6*

A mixture of linear polyethylene with 2.9% of poly(2-vinylpyridine) was melt-spun into 8-filament yarn of approximately 500 denier. Skeins of this yarn were soaked in either glacial acetic acid for 3 minutes at 60° C., or in $POCl_3$ for 2 minutes at 50° C. followed by rinsing in acetone. After scouring, these skeins dyed, by the method used in the previous examples, to a deep blue color with Alizarin Sky Blue B. Untreated yarn, when dyed similarly, took on only a slight blue tint.

Other skeins of this 500-denier yarn were drawn 4:1; good dyeings with Capracyl Orange R were then similarly obtained with different samples which had been first soaked as follows:

| Reagent | Temp. (° C.) | Time (min.) |
|---|---|---|
| 5% Aqueous $H_2SO_3$ | 20 | 15 |
| $PCl_3$ | 60 | 2 |
| Acetic acid | 60 | 2 |
| Sebacoyl chloride | 60 | 2 |

An untreated sample was tinted a faint pink when dyed under conditions which were otherwise the same.

*Example 7*

A mixture containing 2.9% of poly(2-vinylpyridine) and 97.1% of poly(4-methylpentene-1) was melt-spun into 8-filament yarn. A sample of this yarn soaked for one minute at room temperature in $PCl_3$, followed by an acetone and a water rinse, dyed to a deep blue color with Alizarin Sky Blue B. An untreated sample of the yarn was colored only a very pale blue when similarly dyed.

*Example 8*

A mixture of 5 parts of poly(4-vinylpyridine) and 100 parts of polypropylene was melt-spun into 8-filament yarn and drawn to a denier of 168. Different samples of tubular fabric knitted from this yarn were soaked as follows:

| Reagent | Temp. (° C.) | Time (min.) |
|---|---|---|
| Acetic acid | 60 | 2 |
| Benzoyl chloride | 60 | 2 |
| Hydrochloric acid | 50 | 2 |
| Butyl borate | 60 | 2 |

The second and fourth samples were rinsed in acetone and all were then scoured. Deep orange-red colors were obtained when they were dyed with Capracyl Orange R, whereas an untreated sample dyed to only a pale pink.

*Example 9*

Blends of polypropylene with both 2 parts and 4 parts of poly(2-methyl-5-vinylpyridine) per hundred of polypropylene were melt-spun into 8-filament yarns and drawn 4:1 to deniers of approximately 166 and 326 respectively. Different samples of yarn from each blend were soaked as follows:

| Reagent | Temp. (° C.) | Time (min.) |
|---|---|---|
| Acetic acid | 60 | 2 |
| Hydrochloric acid (conc.) | 50 | 2 |
| Benzoyl chloride | 60 | 2 |
| Phosphorus oxychloride | 60 | 2 |

The samples treated with the last two reagents were rinsed in acetone and all were scoured. They all dyed to deep colors with either Capracyl Orange R or Alizarin Sky Blue B. Untreated samples of the yarn when dyed yielded only very pale colors.

*Example 10*

Tubular knit fabric prepared from drawn polypropylene multi-filament (524 denier, 35 filament) containing 2.9% of poly(2-vinylpyridine) was immersed in glacial acetic acid at 60° C. for 1.5 minutes. The acetic acid was washed off with water and the sample was then dyed with 2% (OWF) of Capracyl Violet BD (a neutral metallized dye) at the boil for 1 hour. The dye bath contained 5% (OWF) of acetic acid, as well as a small amount of Triton X–100. The fabric was then washed at 70° C. for 10 minutes with a 0.3% solution of Triton X–100. The dyed fabric was a deep violet in color, and was fast to washing (ASTM Standard Test D–435–42, No. II wash) and to dry cleaning in perchloroethylene (Tentative Test Method 85–1957, page 90 of the 1958 Technical Manual of the American Association of Textile Chemists and Colorists, Volume XXXIV).

When the same procedure was followed except that the treatment with glacial acetic acid was omitted, the resulting fabric was found to be almost colorless.

*Example 11*

Different samples of undrawn monofilament of polypropylene containing 6.5% of poly(2-vinylpyridine) were soaked as follows:

| Reagent | Temp. (° C.) | Time (min.) |
|---|---|---|
| Phosphorus oxychloride | 60 | 2 |
| Sulfur monochloride | 60 | 2 |
| Acetyl chloride | 44 | 2 |
| Sulfuryl chloride | 60 | 2 |

The samples were rinsed in acetone, water, and then scoured. When dyed at the boil with a 2% (OWF) Orange II dye bath containing 5% (OWF) of sulfuric acid and a small amount of Triton X–100, all the samples were found to have a deep orange color. Untreated monofilament, when dyed, remained almost colorless.

*Example 12*

Different samples of a tubular knit fabric prepared from 210-denier drawn multi-filament of polypropylene containing 2.9% of poly(2-vinylpyridine) were soaked as follows:

| Reagent | Temp. (° C.) | Time (min.) |
|---|---|---|
| 1% HCl gas in xylene | Room temp. | 10 |
| Do | 50 | 1 |
| 5% acetic acid in toluene | 50 | 2 |
| Allyl bromide | 60 | 5 |
| Hydrochloric acid (conc.) | 49 | 2 |
| Undecylenic acid | 70 | 5 |
| Saturated solution of anhydrous zinc chloride in chloroform. | Boil | 5 |
| Saturated solution of anhydrous aluminum chloride in chloroform. | do. | 5 |

The allyl bromide-treated sample was rinsed successively in benzene and in acetone, and the undecylenic acid-treated one in acetone. All were then rinsed in water and scoured. When dyed by the usual technique with Alizarin Sky Blue B, colors ranging from medium blue to dark blue were obtained. An untreated sample of this fabric, dyed similarly, yielded an almost colorless product.

*Example 13*

1.0 g. of knit tubular fabric (524 denier, 35 filament) of polypropylene containing 2.9% of poly(2-vinylpyridine) was immersed in glacial acetic acid at 60–65° C. for 1.5 minutes, and then dyed for 1 hour, at the boil, in the following dye bath:

0.05 g. Alizarin Blue SAP-CF (Alizarin Blue BV)
2.5 g. acetic acid
47.5 ml. $H_2O$
1 drop of Triton X–100.

The fabric was then washed in a 0.3% Triton X–100 solution at 70° C. for 10 minutes. The resulting product was found to be colored a very deep blue.

When a similar fabric was subjected to the same procedure without the glacial acetic acid treatment, it was colored only a very light blue.

*Example 14*

Polypropylene batches containing, respectively, 5, 10, and 20% of poly(2-vinylpyridine) were spun into 25-mil monofilament. Samples of each were immersed for 2 minutes at 50° C. in phosphorus trichloride and rinsed in water, then dyed with Alizarin Sky Blue B. All the samples dyed to a deep blue color. When the dyeing was repeated with samples which had not received the phosphorus trichloride treatment, only the one containing 20% of poly(2-vinylpyridine) showed any appreciable color.

*Example 15*

Tubular knit fabric prepared from drawn multi-filament (524 denier, 35 filament) of polypropylene containing 2.9% of poly(2-vinylpyridine) was immersed in a saturated aqueous sulfur dioxide solution for 3 minutes at 70° C. The fabric was then washed with water and scoured in a 0.5% Triton X–100 bath at 85° C. for 10 minutes. The fabric was then dyed at 85° C. for 1 hour with 1% (OWF) Alizarin Sky Blue B containing a small amount of Triton X–100. The dye was almost completely exhausted onto the fiber at the end of this time. The sample was then scoured in a 0.3% Triton X–100 bath at 70° C. for 10 minutes. The resulting fabric was a deep blue in color.

*Example 16*

Samples of the fabric used in Example 15 were placed in stoppered flasks. One flask was filled with nitrogen dioxide gas and allowed to stand for 60 minutes at room temperature. A second, filled with nitrogen dioxide, was kept in an oven at 70° C. for 60 minutes. After removal from the flasks, and washing in water, both fabric samples dyed to a deep blue color with Alizarin Sky Blue B.

*Example 17*

Samples of the fabric used in Example 15 were placed in an autoclave which was then evacuated and filled with sulfur dioxide gas to 32 lbs. gauge pressure. One sample was kept for one hour at room temperature in the autoclave, and others were maintained at temperatures ranging from 60° to 100° C. for periods of time varying from 5 to 30 minutes. After removal from the autoclave and being scoured for 10 minutes at 80° C. with 0.3% Triton X–100, all the samples dyed to a deep orange color with Capracyl Orange R.

*Example 18*

Drawn multi-filament (185 denier, 8 filament) of polypropylene containing 5% of "Zytel 61" polyamide admixed with the polypropylene was knitted into a tubular fabric. The fabric was immersed in phosphorus trichloride at 65° C. for two minutes. The sample was rinsed with acetone and then with water. It could then be dyed (2% OWF) with Alizarin Sky Blue B to a blue color which was fast to washing and dry cleaning.

Samples of the same fabric having had no treatment with $PCl_3$ were essentially uncolored when subjected to the same dyeing procedure.

*Example 19*

Samples of a tubular knitted fabric made from polypropylene containing 3% of admixed "Zytel 61" polyamide (208 denier, 8 filament), and of another containing 5% of "Zytel 61" polyamide (185 denier, 8 filament), were treated with the reagents listed below:

| Reagent | Temp. (° C.) | Time (min.) |
|---|---|---|
| Formic acid (89%) | 90 | 2 |
| Acetic acid | 100 | 2 |
| Phenol | 100 | 2 |

The samples were rinsed in water, scoured, and then dyed with Alizarin Sky Blue B (2% OWF). All the samples dyed to a blue color fast to washing and dry cleaning. Untreated samples did not dye at all.

*Example 20*

Samples of the same two fabrics used in Example 19 were treated as follows:

| Reagent | Temp. (° C.) | Time (min.) |
|---|---|---|
| Acetyl chloride | 50 | 2 |
| Phosphorus oxychloride | 50 | 2 |
| Thionyl chloride | 50 | 2 |
| Sulfur monochloride | 50 | 2 |
| Sulfuryl chloride | 50 | 2 |
| Benzoyl chloride | 50 | 2 |
| Saturated solution of boron trifluoride in toluene | 50 | 2 |
| Conc. (37%) hydrochloric acid (aq.) | 25 | 5 |

The samples treated with hydrochloric acid were rinsed in water; all the others were rinsed in acetone and then in water. All the samples were then dyeable to an orange color with Capracyl Orange R or to a blue color with Alizarin Sky Blue B. The dyeings were fast to washing and dry cleaning. Untreated samples remained essentially colorless when similarly dyed.

*Example 21*

A sample of tubular knit fabric made from 8-filament, 157-denier polypropylene containing 7% of a commercial polyamide identified as a poly(nonylphenyl-N-vinylpyrrolidinone) of softening point about 50–60° C. and mol. wt. about 40,000–50,000, was immersed in phosphorous oxychloride for 2 minutes at 90° C. It was then rinsed in acetone and in water. After this treatment, it could be dyed to a blue color with Alizarin Sky Blue B or to an orange color with Capracyl Orange R. Untreated fabric remained colorless after an attempt to dye it with these dyes.

*Example 22*

Polypropylene monofilament (diameter, 25 mils), containing blended therein 10% of the same polyamide that was used in Example 19, was immersed for 2 minutes at 60° C. in phosphorus trichloride. It was then rinsed with acetone and with water. After this treatment, the sample was dyeable with Orange II to an orange color. Untreated monofilament was not dyeable with this dye.

*Example 23*

A mixture of 100 parts of polypropylene with 4 parts of the reaction product of 3-(dimethylamino)propylamine with a 1:1 styrene-maleic anhydride copolymer was melt-spun into 8-filament yarn and drawn 4:1. Skeins of this yarn were subjected to the treatments listed below, scoured and dyed with 1% (OWF) Capracyl Orange R. Results of these dyeings, along with a similar dyeing made on untreated yarn, are also listed in the table below.

| Reagent | Temp. (° C.) | Time (min.) | Acetone Rinse | Dyed Color |
|---|---|---|---|---|
| None | | | | Pale pink. |
| Acetic acid | 60 | 2 | No | Deep reddish-orange. |
| Hydrochloric acid | 50 | 2 | No | Do. |
| $POCl_3$ | 50 | 2 | Yes | Do. |
| Sebacoyl chloride | 60 | 2 | Yes | Do. |
| n-Butyl borate | 60 | 2 | Yes | Medium reddish-orange. |

*Example 24*

A solution of 74.1 g. of dodecylamine and 74 g. of epichlorohydrin in 300 ml. of ethanol was heated at reflux for 8 hours. It was cooled to room temperature and 86.1 g. of piperazine, 55.5 g. of epichlorohydrin, and 200 ml. of ethanol were added. After the exothermic reaction, which nessitated cooling, subsided, the reaction mixture was heated at reflux for 10 hours. The solution was then cooled, ethanolic alkali was added to convert the amine salt to the free amine, and the ethanol avaporated on a steam bath. The product was finally dried in vacuo.

A mixture of 4 parts of the above material with 100 parts of polypropylene was melt-spun into 8-filament yarn and drawn 3:1. Skeins of this yarn, treated either with sebacoyl chloride (2 min. at 60° C.) or $POCl_3$ (2 min. at 50° C.), followed by rinsing in acetone and scouring, dyed with Capracyl Orange R (1% OWF) to deep redrish-orange and medium reddish-orange colors respectively. Untreated yarn when dyed similarly was almost colorless.

*Example 25*

A solution of 60.2 g. of 50% aqueous poly(ethyleneimine) of approx. 30,000 molecular weight and 59 g. of dodecylbenzyl chloride in 400 ml. of isopropanol was heated at reflux for two hours, under nitrogen. A solution of 12 g. of sodium hydroxide in 15 ml. of water was poured into 150 ml. of isopropanol, and this slurry added to the reaction mixture. Heating was then continued for one hour. The reaction mixture containing the alkylated poly (ethyleneimine) was finally cooled, poured into water, filtered, and dried in vacuo.

A mixture of 3 parts of the above dried material with 100 parts of polypropylene was melt-spun into 8-filament yarn and drawn 3:1. Skeins of this yarn were immersed for 2 minutes at 60° C. in $PCl_3$, sebacoyl chloride, and concentrated hydrochloric acid, respectively, and the first two were rinsed in acetone. They were all then scoured and dyed with 1% (OWF) Capracyl Orange R to a medium salmon color. An untreated skein took up virtually no color at all when dyed similarly.

*Example 26*

A mixture of 5 parts of Polysub Amine 164 (Onyx Chemical Co.), a polymeric tertiary amine, and 100 parts of polypropylene were melt-spun into 8-filament yarn and drawn 4:1. A skein of this yarn, immersed for 2 minutes at 50° C. in $POCl_3$, followed by an acetone rinse and scouring, dyed to a medium blue color with 1% (OWF) Alizarin Sky Blue B. An untreated sample, when dyed similarly, remained colorless.

*Example 27*

Different samples of tubular knit fabric from 524-denier, 35-filament yarn of polypropylene containing 2.9% of added poly(2-vinylpyridine) was treated with the following concentrated mineral acids:

| Acid | Temp. (° C.) | Time (min.) |
|---|---|---|
| Sulfuric | 100 | 4 |
| Perchloric | 120 | 15 |
| Phosphoric | 160 | 15 |

After rinsing in water and scouring, these all dyed to deep orange-red colors with Capracyl Orange R. An untreated sample, or one heated in an air oven for 15 minutes at 120° C., produced only pale pink colors when dyed similarly.

It will be obvious to a person skilled in the art that the undyed hydrocarbon polymer treated in accordance with the invention is not a mere transitory product but is a useful article of commerce in itself, capable of being manufactured and sold to textile producers or others who carry out the actual dyeing of the treated hydrocarbon polymer. It will be understood that not only Capracyl Orange R (Acid Orange 60), a premetallized dye, and Alizarin Sky Blue B (Acid Blue 78), a milling acid dye, may be used in the invention, but any other suitable conventional dyes may be used. Thus, the fiber treated according to the invention is highly dyeable with all dyes in the acid class, including such as Reactone Red 2B (Geigy), a reactive dye; Pontamine Fast Yellow 4GL (Direct Yellow 44), a direct dye; and Alizarin Red S (Mordant Red 3), a mordant acid dye.

We desire to emphasize expressly that chlorine and hypochlorous acid are not suitable acids for use in the method of the invention because their use gives a product which is not fast to light. We desire to make reference to the fact that the atactic type of vinylpyridine polymer is lower-melting than the isotactic kind and therefore the atactic vinylpyridine polymer can be blended with the hydrocarbon polymer with greater facility than isotactic vinylpyridine polymer.

The mere use of dilute aqueous acetic acid in the dye bath, as, for example, in Belgian Patent 593,667, does not serve the purposes of the present invention wherein the acid treatment is undertaken as a separate step prior to the dyeing step (as distinguished from simultaneous exposure to dilute acid and dye) and wherein the acetic acid is applied either in glacial (undiluted) form, or from a non-aqueous solution of glacial acetic acid in a volatile organic solvent, or from a concentrated (at least 20%) aqueous solution, as distinguished from the much more dilute aqueous solution commonly present in dye baths. In dilute (e.g., 1–5%) aqueous solution, acetic acid does not diffuse into the polymer mixture nor react with the basic polymer sufficiently for purposes of the invention.

In order to illustrate the lack of effect in the process of our invention of the very low concentrations of acid used in dye baths, the experiments below were carried out.

Different samples of tubular knit fabric made from polypropylene containing 2.9% of poly(2-vinylpyridine) were immersed for 2 minutes at 50° C. in the following acetic acid solutions: 100%, 50%, 20%, 10%, and 0%, the diluent being water. They were then scoured and dyed with 2% (OWF) Capracyl Orange R. Depths of color obtained were:

100% acetic acid: deep reddish orange
50% acetic acid: medium reddish orange
20% acetic acid: pale reddish orange
10% acetic acid: very pale reddish orange
0% acetic acid: slightly lighter than the previous sample.

Other samples of a similar fabric made from polypropylene containing 2.9% of poly(2-vinylpyridine) were immersed for 2 minutes at 50° C. in the following concentrations of hydrochloric acid, the diluent being water: 100% (laboratory "concentrated" acid, containing 37% HCl), 50%, 20%, 10%, 5% and 0%. After scouring, they were dyed with 2% (OWF) Alizarin Sky Blue B. The depths of color obtained were as follows:

100% hydrochloric acid: deep blue
50% hydrochloric acid: pale blue
20% hydrochloric acid: slight bluish tinge
10% hydrochloric acid: essentially colorless
5% hydrochloric acid: essentially colorless
0% hydrochloric acid: essentially colorless.

Having thus described our invention, what we claim and desire to protect by Letters Patent is:

1. A shaped article of commerce which is readily dyeable with acid type dyes consisting essentially of a composition of a fiber-forming alpha-mono-olefin polymer, between about 0.5% and 10% of a thermoplastic, nitrogen-containing basic polymer having a basic ionization constant greater than $10^{-14}$, and which, in the case of vinyl-substituted mono- and polycyclic pyridine polymers is non-stereoregular, and the products of interaction of said basic polymer with an acidic reagent capable of reacting with said basic polymer at least to the extent attained when the acidic reagent is 20% acetic acid and selected from the group consisting of Lewis acids and Lewis acid generating materials, the acidic reagent having been applied and infused into the alpha-mono-olefin polymer blend after shaping and before dyeing.

2. The shaped article of claim 1 which contains between about 0.5% and 5% of said nitrogen-containing basic polymer.

3. A shaped article of commerce which is readily dyeable with acid type dyes consisting essentially of a blend of fiber-forming alpha-mono-olefin polymer and between about 0.5% and 10% of a thermoplastic nitrogen-containing basic polymer having a basic ionization constant greater than $10^{-14}$, and which, in the case of vinyl-substituted mono- and polycyclic pyridine polymers is non-stereoregular, some of said basic polymer at and near the surface of said article being in the form of a reaction product thereof with an acidic reagent capable of reacting with said basic polymer at least to the extent attained when the acidic reagent is 20% acetic acid, and selected from the group consisting of (I) concentrated mineral acids and the acid halides thereof,
(II) gaseous acid anhydrides of minerals acids,
(III) organo-carboxylic acids and the halides thereof,
(IV) halides of non-metallic elements which liberate hydrohalic acid on contact with water,
(V) metal halides which liberate hydrohalic acid on contact with water,
(VI) allylic halides,
(VII) benzylic halides,
(VIII) boron trifluoride,
(IX) phenol, said acidic reagent having been applied and infused into said alpha-mono-olefin polymer blend after shaping and before dyeing.

4. A filamentary article which is readily dyeable with acid type dyes consisting essentially of an alpha-mono-olefin polymer, between about 0.5% and 10% of a thermoplastic nitrogen-containing basic polymer, having a basic ionization constant greater than $10^{-14}$, and which, in the case of vinyl-substituted mono- and polycyclic pyridine polymers is non-stereoregular, and the products of interaction of said basic polymer with an acidic reagent capable of reacting with said basic polymer at least to the extent attained when the acidic reagent is 20% acetic acid, the acidic reagent having been applied and infused into the alpha-mono-olefin polymer after shaping and before dyeing of the filamentary article, and being selected from the group consisting of (I) concentrated mineral acids and the acid halides thereof,
(II) gaseous acid anhydrides of mineral acids,
(III) organo-carboxylic acids and the halides thereof,
(IV) halides of non-metallic elements which liberate hydrohalic acid on contact with water,
(V) metal halides which liberate hydrohalic acid on contact with water,
(VI) allylic halides,
(VII) benzylic halides,
(VIII) boron trifluoride,
(IX) phenol.

5. Fiber which is readily dyeable with acid type dyes consisting essentially of a blend of an alpha-mono-olefin polymer, between about 0.5% and 10% of a thermoplastic nitrogen-containing basic polymer, having a basic ionization constant greater than $10^{-14}$, and which, in the case of vinyl-substituted mono- and polycyclic pyridine polymers, is non-stereoregular, and the products of interaction of said basic polymer with an acidic reagent capable of reacting with said basic polymer at least to the extent attained when the acidic reagent is 20% acetic acid, said acidic reagent having been applied and infused into the alpha-mono-olefin polymer blend after shaping of the fiber and before dyeing, and selected from the group consisting of (I) concentrated mineral acids and the acid halides thereof,
(II) gaseous acid anhydrides of mineral acids,
(III) organo-carboxylic acids and the halides thereof,
(IV) halides of non-metallic elements which liberate hydrohalic acid on contact with water,
(V) metal halides which liberate hydrohalic acid on contact with water,
(VI) allylic halides,
(VII) benzylic halides,
(VIII) boron trifluoride,
(IX) phenol.

6. A shaped article of commerce characterized by a high degree of dyeability with acid type dyes and consisting essentially of an intimate blend of a fiber-forming alpha-mono-olefin polymer, between about 0.5% and 10% of a thermoplastic nitrogen-base polymer selected from the group consisting of (I) non-stereoregular vinylpyridine polymers,
(II) polyamides, and
(III) amine polymers, said nitrogen-base polymer being nonextractable to the extent of at least 10%, by water at pH 3, and the products of interaction of said basic polymer with an acidic reagent capable of reacting with said nitrogen-base polymer at least to the extent attained when the acidic reagent is 20% acetic acid and selected from the group consisting of (I) concentrated mineral acids and the acid halides thereof,
(II) gaseous acid anhydrides of mineral acids,
(III) organo-carboxylic acids and halides thereof,
(IV) halides of non-metallic elements which liberate hydrohalic acid on contact with water,
(V) metal halides which liberate hydrohalic acid on contact with water,
(VI) allylic halides,
(VII) benzylic halides,
(VIII) boron trifluoride,
(IX) phenol, said acidic reagent having been applied and infused into the alpha-mono-olefin polymer blend after shaping and before dyeing.

7. The shaped article of claim 6 which contains between about 0.5% and 5% of said nitrogen-containing basic polymer.

8. A shaped article of commerce characterized by a high degree of dyeability with acid type dyes, and consisting essentially of an intimate blend of a fiber-forming alpha-mono-olefin polymer selected from polyethylene, polypropylene and poly(4-methyl-1-pentene), and between about 0.5% and 10% of a thermoplastic nitrogen-containing basic polymer having a basic ionization constant greater than $10^{-14}$, which, in the case of vinyl-substituted mono- and polycyclic pyridine polymers, is non-stereoregular, and the products of interaction of said basic polymer with an acidic reagent capable of reacting with said basic polymer at least to the extent attained when the acidic reagent is 20% acetic acid, and selected from the group consisting of Lewis acids and Lewis acid generating materials, said acidic reagent having been applied and infused into the alpha-mono-olefin polymer blend after shaping and before dyeing thereof.

9. A shaped article of commerce characterized by a high degree of dyeability with acid type dyes and consisting essentially of an intimate blend of a fiber-forming alpha-mono-olefin polymer selected from polyethylene, polypropylene, and poly(4-methyl-1-pentene), and between about 0.5% and 10% of a thermoplastic nitrogen-base polymer, selected from non-stereoregular vinylpyridine polymers, polyamides, and amine polymers, the said nitrogen-base polymer being nonextractable to the extent of at least 10%, by water at pH 3, and the products of interaction of said nitrogen-base polymer with an acidic reagent as in claim 6, said acidic reagent being capable of reacting at least to the extent attained when the acidic reagent is 20% acetic acid, said acidic reagent having been applied and infused into the alpha-mono-olefin polymer blend after shaping and before dyeing thereof.

10. Sheets, films, filaments, and fibers characterized by a high degree of dyeability with acid type dyes and consisting essentially of a blend of a fiber-forming alpha-mono-olefin polymer, between about 0.5% and 10% of a thermoplastic nitrogen-base polymer, which in the case of vinyl-substituted mono- and polycyclic pyridine polymers, is non-stereoregular, and the products of interaction of said base polymer with an acidic reagent, said nitrogen-base polymer acidic reagent being as defined in claim 6, said acidic reagent being capable of reacting at least to the extent attained when the acidic reagent is 20% acetic acid, said acidic reagent having been applied and infused into the alpha-mono-olefin polymer blend after shaping and before dyeing thereof.

11. Filamentary material characterized by a high degree of dyeability with acid type dyes and consisting essentially of an intimate blend of polypropylene, between about 0.5% and 10% of a non-stereoregular monovinylpyridine polymer, said vinylpyridine polymer being selected from homopolymers, copolymers with other monovinylpyridine monomers, and copolymers with other vinyl monomers, and the products of interaction of said vinylpyridine polymer with an acidic reagent as defined in claim 6, said acidic reagent being capable of reacting at least to the extent attained when the acidic reagent is 20% acetic acid, said acidic reagent having been applied and infused into the polypropylene blend after conversion to the filamentary form and before dyeing thereof.

12. Filamentary material characterized by a high degree of dyeability with acid type dyes and consisting essentially of an intimate blend of polyethylene, between about 0.5% and 10% of a non-stereoregular monovinylpyridine ploymer, said vinylpyridine polymer being selected from homopolymers, copolymers with other monovinylpyridine monomers, and copolymers with other vinyl monomers, and the products of interaction of said vinylpyridine polymer with an acidic reagent as in claim 6, said acidic reagent being capable of reacting at least to the extent attained when the acidic reagent is 20% acetic acid, said acidic reagent having been applied and infused into the polyethylene blend after conversion to the filamentary form and before dyeing thereof.

13. Filamentary material characterized by a high degree of dyeability with acid type dyes and consisting essentially of an intimate blend of poly(4-methyl-1-pentene), between about 0.5% and 10% of a non-stereoregular monovinylpyridine polymer, said vinylpyridine polymer being selected from homopolymers, copolymers with other monovinylpyridine monomers, and copolymers with other vinyl monomers, and the products of interaction of said vinylpyridine polymer with an acidic reagent as in claim 6, said acidic reagent being capable of reacting at least to the extent attained when the acidic reagent is 20% acetic acid, said acidic reagent having been applied and infused into the poly(4-methyl-1-pentene) blend after conversion to the filamentary form and before dyeing thereof.

14. Filamentary material characterized by a high degree of dyeability with acid type dyes and consisting essentially of an intimate blend of polypropylene, between about 0.5% and 10% of a polyamide selected from (a) condensation homopolymers and condensation copolymers in which the amido groups are integral parts of the polymer chain, and (b) addition homopolymers and addition copolymers having substituents containing amido groups pendant from the polymer chain, and the products of interaction of said polyamide with an acidic reagent as in claim 6, the extent of reaction being at least that attained when the acidic reagent is 20% acetic acid, said acidic reagent having been applied and infused into the polypropylene and polyamide blend after shaping into the filamentary form and before dyeing thereof.

15. Filamentary material characterized by a high degree of dyeability with acid type dyes and consisting essentially of an intimate blend of polyethylene, between about 0.5% and 10% of a polyamide selected from (a) condensation homopolymers and condensation copolymers in which the amido groups are integral parts of the polymer chain, and (b) addition homopolymers and addition copolymers having substituents containing amido groups pendant from the polymer chain, and the products of interaction of said polyamide with an acidic reagent as in claim 6, the extent of reaction being at least that attained when the acidic reagent is 20% acetic acid, said acidic reagent having been applied and infused into the polyethylene and polyamide blend after shaping into filamentary form and before dyeing thereof.

16. Filamentary material characterized by a high degree of dyeability with acid type dyes and consisting essentially of an intimate blend of poly(4-methyl-1-pentene), between about 0.5% and 10% of a polyamide selected from (a) condensation homopolymers and condensation copolymers in which the amido groups are integral parts of the polymer chain, and (b) addition homopolymers and addition copolymers having substituents containing amido groups pendant from the polymer chain, and the products of interaction of said polyamide with an acidic reagent as in claim 6, the extent of reaction being at least that attained when the acidic reagent is 20% acetic acid, said acidic reagent having been applied and infused into the poly(4-methyl-1-pentene) and polyamide blend after shaping into filamentary form and before dyeing thereof.

17. Filamentary material characterized by a high degree of dyeability with acid type dyes and consisting essentially of an intimate blend of polypropylene, between about 0.5% and 10% of a polyamine selected from (a) condensation homopolymers and condensation copolymers in which the amino groups are integral parts of the polymer chain, and (b) addition homopolymers and addition copolymers having substituents containing amino groups pendant from the polymer chain, and the products of interaction of said polyamine with an acidic reagent as in claim 6, the extent of reaction being at least that attained when the acidic reagent is 20% acetic acid, said acidic reagent having been applied and infused into the polypropylene and polyamine blend after shaping into filamentary form and before dyeing thereof.

18. Filamentary material characterized by a high degree of dyeability with acid type dyes and consisting essentially of an intimate blend of polyethylene, between about 0.5% and 10% of a polyamine selected from (a) condensation homopolymers and condensation copolymers in which the amino groups are integral parts of the polymer chain, and (b) addition homopolymers and addition copolymers having substituents containing amino groups pendant from the polymer chain, and the products of interaction of said polyamine with an acidic reagent as in claim 6, the extent of reaction being at least that attained when the acidic reagent is 20% acetic acid, said acidic reagent having been applied and infused into the polyethylene and polyamine blend after shaping into filamentary form and before dyeing thereof.

19. Filamentary material characterized by a high degree of dyeability with acid type dyes and consisting essentially of an intimate blend of poly(4-methyl-1-pentene), between about 0.5% and 10% of a polyamine selected from (a) condensation homopolymers and condensation copolymers in which the amino groups are integral parts of the polymer chain, and (b) addition homopolymers and addition copolymers having substituents containing amino groups pendant from the polymer chain, and the products of interaction of said polyamine with an acidic reagent as in claim 6, the extent of reaction being at least that attained when the acidic reagent is 20% acetic acid, said acidic reagent having been applied and infused into the poly(4-methyl-1-pentene) and polyamine blend after shaping into filamentary form and before dyeing thereof.

20 Filamentary material characterized by a high degree of dyeability with acid type dyes and consisting essentially of an intimate blend of polypropylene, between about 0.5% and 10% of a styrene-N-aminoalkyl-maleimide copolymer, and the products of interaction of said copolymer with an acidic reagent as in claim 6, the extent of reaction being at least that attained when the acidic reagent is 20% acetic acid, said acidic reagent having been applied and infused into the polypropylene and copolymer blend after shaping into filamentary form and before dyeing.

21. Filamentary material characterized by a high degree of dyeability with acid type dyes and consisting essentially of an intimate blend of polypropylene, between about 0.5% and 10% of a non-stereoregular monovinylpyridine polymer, said vinylpyridine polymer being selected from homopolymers, copolymers with other monovinylpyridine monomers, and copolymers with other vinyl monomers, and the products of interaction of said vinylpyridine polymer with an organic monocarboxylic acid of 1 to 18 carbon atoms, the extent of reaction being at least that attained when the acid is 20% acetic acid, said monocarboxylic acid having been applied and infused into the blend of polypropylene and vinylpyridine polymer after shaping into filamentary form and before dyeing thereof.

22. Filamentary material characterized by a high degree of dyeability with acid type dyes, and consisting essentially of an intimate blend of polypropylene, between about 0.5% and 10% of a non-stereoregular monovinylpyridine polymer, said vinylpyridine polymer being selected from homopolymers, copolymers with other monovinylpyridine monomers, and copolymers with other vinyl monomers, and the products of interaction of said vinylpyridine polymer with sulfurous acid, the extent of reaction being at least that attained when 20% acetic acid is used, said sulfurous acid having been applied and infused into the blend of polypropylene and vinylpyridine polymer after shaping into filamentary form and before dyeing thereof.

23. A dyed article comprising the shaped article of claim 6 infused with dye material selected from the class of acid dyes consisting of strong acid dyes, direct dyes, metallized dyes, mordant dyes, and reactive dyes.

24. The process of making articles intensely dyeable with acid type dyes, which comprises in sequence the steps of blending with a fiber-forming alpha-mono-olefin polymer between about 0.5% and 10% of a thermoplastic nitrogen-containing basic polymer having a basic ionization constant greater than $10^{-14}$, which in the case of vinyl-substituted mono- and polycyclic pyridine polymers is non-stereoregular, forming the resulting blend into a shaped article and applying and infusing into the article before dyeing an acidic reagent capable of reacting with said basic polymer at least to the extent attained when the acidic reagent is 20% acetic acid, and selected from the group consisting of Lewis acids and Lewis acid generating materials.

25. The process of making articles intensely dyeable with acid type dyes which comprises in sequence the steps of blending with a fiber-forming alpha-mono-olefin polymer between about 0.5% and 10% of a thermoplastic nitrogen-containing basic polymer having a basic ionization constant greater than $10^{-14}$, which in the case of vinyl-substituted mono- and polycyclic pyridine polymers is non-stereoregular, forming the resulting blend into a shaped article, and applying and infusing into the article before dyeing an acidic reagent which reacts with only a portion of said basic polymer, the extent of reaction being at least that attained when the acidic reagent is 20% acetic acid, said acidic reagent being selected from the group defined in claim 6.

26. A method of making fiber having a high degree of dyeability with acid type dyes from a fiber-forming alpha-mono-olefin polymer which normally is difficulty dyeable, comprising blending said alpha-mono-olefin polymer with between about 0.5% and 10% of a nitrogen-base polymer selected from non-stereoregular vinylpyridine polymers, polyamides and amine polymers, said nitrogen-base polymer being non-extractable to the extent of at least 10% of its weight, by water at pH 3, shaping the resulting blend into fiber, and applying and infusing before dyeing at least the surface of said fiber in the presence of water, with an acidic reagent as defined in claim 6, capable of reacting with said nitrogen-base polymer at least to the extent attained when the acidic reagent is 20% acetic acid.

27. A method of making polypropylene fiber having a high degree of dyeability with acid type dyes comprising blending polypropylene with between about 0.5% and 10% of a non-stereoregular vinylpyridine polymer which is nonextractable to the extent of at least 10% of its weight, by water at pH 3, shaping the resulting blend into fiber, and applying and infusing before dyeing at least the surface of the fiber in the presence of water with an acidic reagent as in claim 6, which is capable of reacting with said vinyl pyridine polymer at least to the extent attained when the acidic reagent is 20% acetic acid.

28. The method of claim 27 in which the acidic reagent is an organic monocarboxylic acid of from 1 to 18 carbon atoms.

29. The method of claim 27 in which the acidic reagent is sulfurous acid.

References Cited
UNITED STATES PATENTS

| | | | |
|---|---|---|---|
| 3,098,697 | 7/1963 | Cappuccio et al. | 260—897 |
| 3,115,478 | 12/1963 | Guistiniani et al. | 260—895 |
| 3,137,989 | 6/1964 | Fior et al. | 260—857 |
| 3,151,928 | 10/1964 | Cappuccio et al. | 260—895 |
| 3,156,743 | 10/1964 | Coover et al. | 260—895 |
| 3,161,608 | 12/1964 | Caldwell et al. | 260—857 |
| 3,199,940 | 8/1965 | Toureille | 8—55 |
| 3,230,029 | 1/1966 | Cappuccio | 8—55 |
| 3,236,918 | 3/1966 | Tsunoda | 260—896 |
| 3,184,281 | 5/1965 | Tsunoda | 8—55 |
| 3,231,530 | 1/1966 | Prahl | 8—55 |

MURRAY TILLMAN, *Primary Examiner.*

S. H. BLECH, *Examiner.*

P. LIEBERMAN, *Assistant Examiner.*